United States Patent
Barry et al.

[11] 3,781,713
[45] Dec. 25, 1973

[54] CARBON MONOXIDE LASER BY ACETYLENE OXIDATION

[75] Inventors: James D. Barry; William E. Boney, both of Fairborn, Ohio

[73] Assignee: The United States of America as represented by the Secretary of the Air Force, Washington, D.C.

[22] Filed: Nov. 7, 1972

[21] Appl. No.: 304,586

[52] U.S. Cl. ................................. 331/94.5, 330/4.3
[51] Int. Cl. ............................................... H01s 3/22
[58] Field of Search ..................... 331/94.5; 330/4.3

[56] References Cited
UNITED STATES PATENTS
3,704,428  11/1972  Barry et al. ......................... 331/94.5

Primary Examiner—William L. Sikes
Attorney—Harry A. Herbert, Jr. et al.

[57] ABSTRACT

A direct current discharge gas laser charged with a mixture of helium-air-acetylene, through the chemical interaction induced by the dc discharge providing CO, results in a more efficient carbon monoxide laser with laser emission on the P-branch vibrational-rotational transitions from $v=3:2$ to $v=11:10$ with J nominally from 11 to 14. The wavelength of laser emissions extend to below 5.0 microns.

6 Claims, 1 Drawing Figure

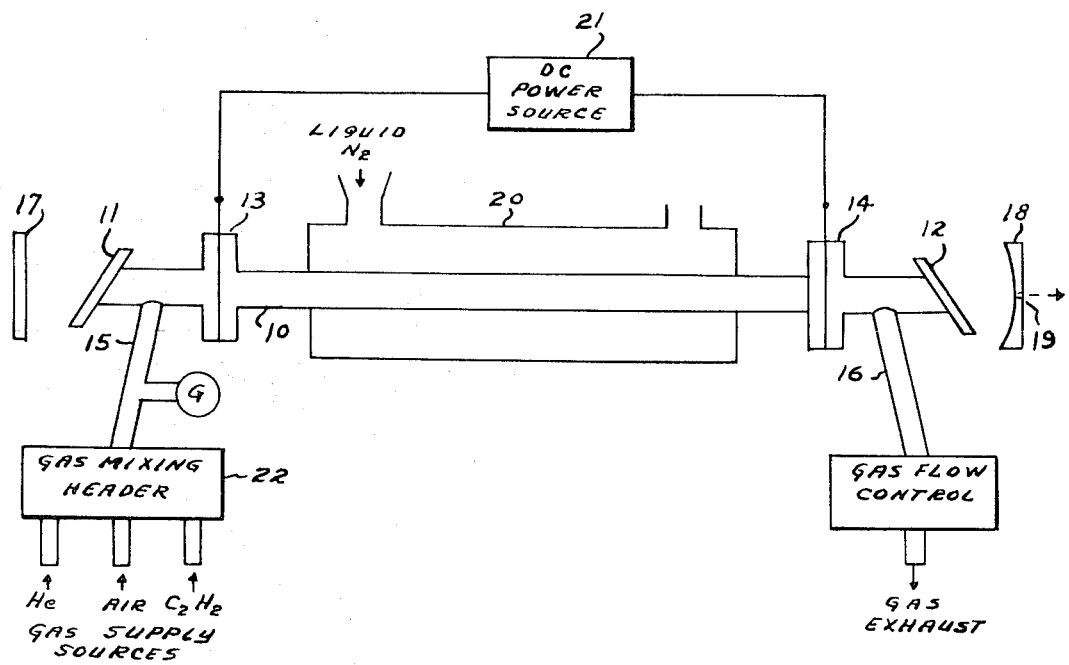

CARBON MONOXIDE LASER BY ACETYLENE OXIDATION

BACKGROUND OF THE INVENTION

The field of the invention is in the gas laser art.

Gas lasers are well known and the lasing of CO gas is well known. In many of the prior art CO lasers the CO has been induced directly into the laser gas chamber. It has also been found that improved operation may be obtained by producing the CO in the laser gas chamber from other gases induced in the enclosed space. Copending application Ser. No. 186,334 discloses the electrochemical production of CO in a laser from methane gas. Additional information concerning this invention may be found in the publication "CO Laser Action by $C_2H_2$ Oxidation" appearing in Applied Physics Letters, Vol. 20, No. 7, of April 1, 1972 at pages 243 and 244.

SUMMARY OF THE INVENTION

An improved efficiency CO laser, having a conversion efficiency of approximately 10 percent, is provided by electro-chemically forming the stimulated CO in the lasing gas chamber from the oxidation of acetylene ($C_2H_2$) with air ($O_2$) in the dc discharge.

BRIEF DESCRIPTION OF THE DRAWING

The single FIGURE of the drawing shows in schematic form the apparatus of the invention.

DESCRIPTION OF THE PREFERRED EMBODIMENT

It has been found that generally the more exothermic the dc discharged induced electro-chemical reaction that take place in the laser gas chamber forming the CO, the greater the stimulation of the CO gas and the greater the laser output becomes with a given input, hence, improving the efficiency of the laser. The primary reaction occurring in the present invention may be summarized as;

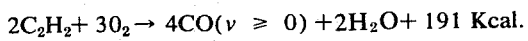

$$2C_2H_2 + 3O_2 \rightarrow 4CO(\nu \geq 0) + 2H_2O + 191 \text{ Kcal.}$$

Generally, normal air is used to supply the oxygen required for the reaction. While oxygen may be used directly the additional cooling provided by the other components of the air is desirable. It is to be understood that an explosive hazard does exist with this apparatus and care should be taken in operating the apparatus. It has been found that during continued discharge operation that flowing gases are required as the tube warms up from 77°K. Catastrophic failure of the tube has occurred, immediately after operation, with the gases flowing and the discharge extinguished. Apparently this has been due to a hot electrode or particle within the tube providing the ignition.

A typical embodiment of the invention is shown schematically in the drawing. To aid those practicing this invention, a specific embodiment, with typical operating parameters, will be described in detail. It is to be considered as an example and not as limiting the scope of the invention. The conventional mechanical structure of the laser comprises a double-walled discharge tube 10 have an inside diameter of 2.5 cm, $CaF_2$ Brewster windows 11 and 12, coupling flanges with electrodes 13 and 14, and gas inlet and outlet ports 15 and 16. The optical cavity between the flat mirror 17 and the 10m radius concave mirror 18, positioned about the enclosed space, resonates the lasing gas. The concave mirror 18 has a 2mm centered circular hole 19 for coupling coherent radiation from the said cavity to provide a useful radiation output. The optical cavity is approximately 140 cm in length. Both mirrors are gold coated having approximately a 98 percent reflective characteristic. The discharge length between the flanged electrodes is approximately 85 cm. The cooling tank 20 for containing the coolant, typically liquid nitrogen, extends over approximately 74 cm of the discharge region. The direct current power source 21 supplies the electrical energy required by the discharge. The respective electrical polarity of the individual eletrodes is immaterial. In this particular embodiment being described in detail typical values of dc current are from 10 to 25 milliamperes, and the multimode power output is approximately 3 watts.

The helium, air, and acetylene gases are mixed in the gas mixing header 22 and fed directly into the laser discharge region. The ratios of the gases in the mixture are not critical. An optimum value has been found to be approximately 60-25-1 of He-air-$C_2H_2$ respectively. Total tube pressures of 3 to 4 Torr, and gas flow pumping rates of approximately 35 liters per minute have been found generally to be optimum but not critical values. Lower flow rates may be used with lower cooling temperatures.

Lasing CO emission has been measured in air from the output of this particular embodiment as low as 4.8939 micrometers with radiation spectrum elements extending to approximately 5.6 micrometers. These relatively high efficient, low wavelength emissions have not heretofore been obtainable with conventional CO lasers.

We claim:
1. A gas laser comprising:
   a. means forming an enclosed space;
   b. a gaseous mixture comprising helium, air, and acetylene;
   c. means for introducing said gaseous mixture within said enclosed space;
   d. means for supplying a direct current excitation field to said gaseous mixture to electrochemically form active lasing carbon monoxide from said gaseous mixture;
   e. means for cooling at least a portion of said enclosed space; and
   f. means forming an optical resonant cavity positioned about said enclosed space for resonating and for coupling coherent laser radiation from said cavity.
2. The gas laser as claimed in 1 wherein the ratios of the said gaseous mixture of He-air-$C_2H_2$ are approximately 60-25-1 respectively.
3. The gas laser as claimed in claim 2 wherein the said means for introducing the said gaseous mixture within the said enclosed space includes means for providing a gas flow through the said enclosed space.
4. The gas laser as claimed in claim 3 wherein the said gas flow is at a rate of approximately 35 liters per minute.
5. The laser as claimed in claim 4 wherein the total gas pressure within the said enclosed space is from 3 to 4 Torr.
6. The gas laser as claimed in claim 5 wherein the said means for cooling is with a coolant having a temperature of at least as low as that of liquid nitrogen.

* * * * *